May 14, 1935.  A. J. BRICKNER  2,001,122
LAP
Filed Sept. 24, 1934
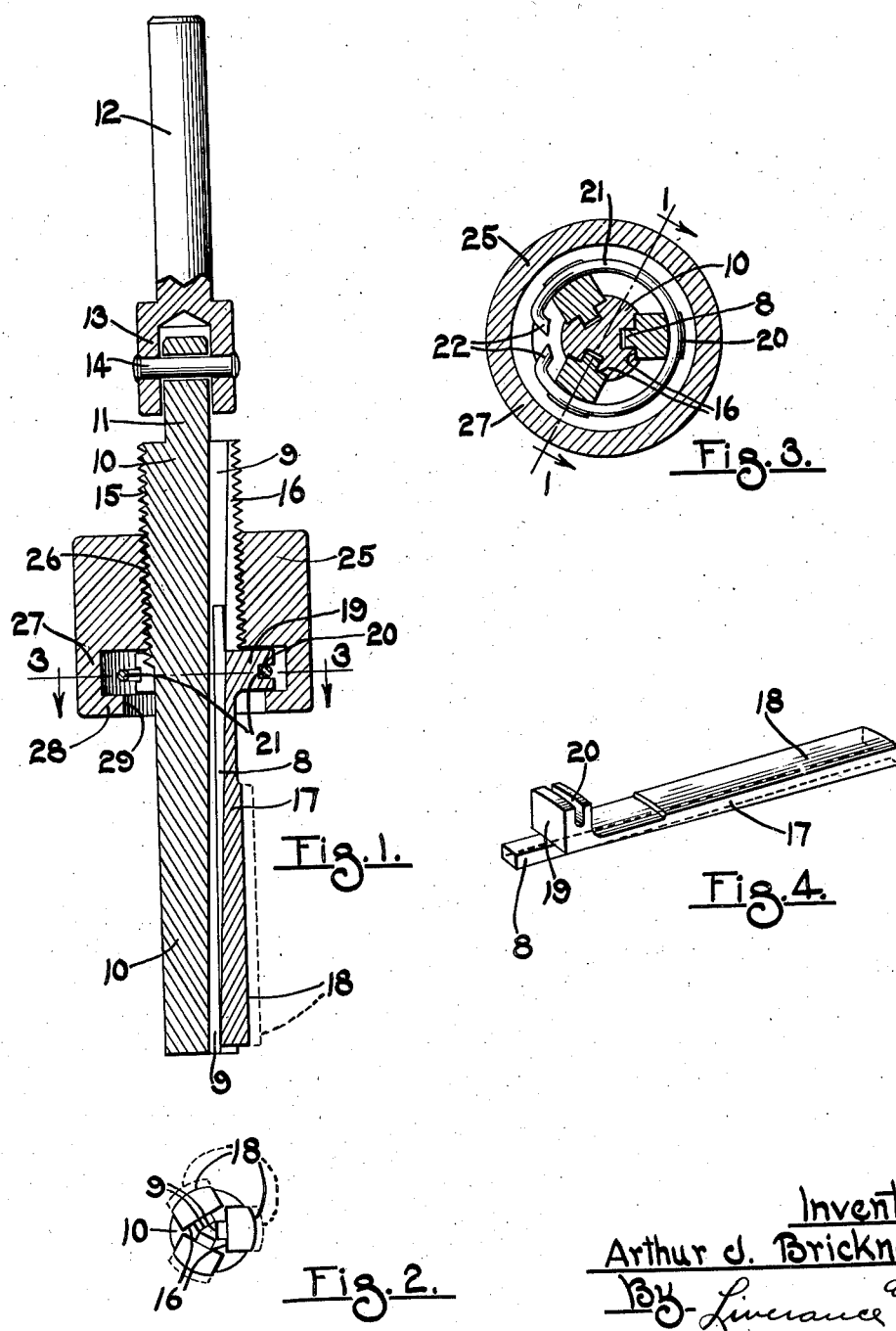
Inventor
Arthur J. Brickner Patented May 14, 1935

2,001,122

UNITED STATES PATENT OFFICE 2,001,122

LAP

Arthur J. Brickner, Muskegon Heights, Mich., assignor to Brickner-Kropf Machine Company, Muskegon, Mich., a corporation of Michigan Application September 24, 1934, Serial No. 745,283

5 Claims. (Cl. 51—184.1)

This invention relates generally to a machine tool and more particularly to a lap or honing attachment.

Briefly described, my article consists of a body member having three axially slidable shoes thereon together with means for adjusting and maintaining and detaching these shoes.

One of the objects of my invention is to provide a construction of this character wherein the shoes may be placed part way in the runways in which they seat and held therein while the means for adjusting them, namely, a collar, can be inserted over the shoes and then the several parts slid axially along the body member whereupon the collar member becomes detachably interlocked with the shoes and thus the collar serves as a means for adjusting the shoes axially. This axial adjustment increases or decreases the diameter of the outer honing surface of the lap and furthermore the collar serves as a shielding or protecting housing for the protruding ends of the several shoes.

Another feature of my invention resides in the manner and means whereby the shoes are yieldably held in snug engagement with their respective runways. This is a resilient ring and this ring is formed so that it can not rotate relatively to the shoes and this is another feature.

Another advantage resides in the universal connection between the upper part of the body member whereby a limited amount of rotative adjustment is permitted and this gives better operation of the tool.

Other advantages will become apparent as the description proceeds.

In the drawing:—

Fig. 1 is a sectional view taken along the line 1—1 of Fig. 3.

Fig. 2 is an end view of Fig. 1.

Fig. 3 is a sectional view taken along the line 3—3 of Fig. 1.

Fig. 4 is a perspective view of one of the shoes.

Like numerals refer to like parts throughout the several views.

As shown in Fig. 1, numeral 10 indicates a body member having a reduced stem 11 extending upwardly therefrom. A spindle 12, adapted to be received in a rotating socket or the like, is enlarged to form a socket 13 and a riveted pin 14 loosely connects the spindle onto the body member. The rivet or pin 14 fits into a cylindrical hole as shown and this hole is of larger diameter than the pin and consequently both universal and turning movement is permitted between the spindle and the body member. The stem 11 is of lesser diameter than the recess in the socket member 13 whereby this movement is permitted.

The body member 10 is threaded as indicated at 15 and has three runways 16 extending therealong. Each of these runways has a narrow groove 9 extending longitudinally and medially along its bottom surface. Both the runways and grooves are tapered as clearly shown in Fig. 1 and shoes 17 are slidably received therein.

Each shoe is of identical construction having an inner tapered surface 17 which is complementary to the bottom of the runway 16 in which it slides. The lower end of the shoe has an outer surface 18, this being of cylindrical contour and receiving the abrasive material which acts upon the article which is being honed. The upper end of the shoe 17 has an enlarged portion or boss 19 and a groove 20 is cut therethrough as shown. The bottom side of each shoe has a rib 8 therealong. This rib serves to strengthen the shoe. It is to be noted that the rib is the strongest at the weakest portion of the shoe and gradually tapers away as the shoe thickens. See Fig. 4. The rib 8, see Fig. 1, is received within the groove 9, and does not contact with the bottom thereof.

The several grooves 20, see Fig. 3, receive the resilient ring 21, this ring having its ends turned laterally as indicated at 22.

A collar 25 is interiorly threaded as indicated at 26 and threads onto the threaded portion 15 of the body member. The collar extends downwardly as indicated at 27 and then inwardly as indicated at 28 and consequently an opening 29 is formed therein. See Fig. 1. Thus the upper ends of the several shoes 17 and the resilient ring 21 are shielded and protected.

The assembly and disassembly of my device is one of the features of my invention and is accomplished as follows: The three shoes are located in the three grooves with the boss portions thereof adjacent to the lower end of the body member and consequently, when in this position, have a minimum exterior diameter. That is, the top surfaces of the several bosses are closest together at this point. Consequently the resilient ring 21 is easily inserted in position and then the collar member, this collar member having been previously slid upon the lower portion of the body member 10, is now slid downwardly over the several bosses and the resilient ring 21. The ring 21 is of course seated in the grooves. The diameter of the opening 29 is great enough to clear the bosses 19 when the several parts are located as described and thus the bosses and the ring slide inwardly within the portion 27 of the collar 20.

The several parts are now slid upwardly and the collar 25 threaded onto the lower end of the threaded portion 15 and this movement causes an outward movement of the bosses whereby they become locked behind the ledge 28 of the collar 25.

The parts are now in their operative position and rotative movement of the collar 25 causes a corresponding movement of the shoe 17 whereby the desired diametrical expansion thereof may be obtained and the tool operated as previously described. The shoes 17 may have the honing surface of any desired diameter as indicated by the dotted line showing of Figs. 1 and 2.

The invention is defined in the appended claims and is to be considered comprehensive of all forms of structure coming within their scope.

I claim:

1. A lapping tool of the class described comprising, a body member having a plurality of runways extending from one end thereof, a shoe for each runway, the surfaces of the shoes and runways being so formed as to cause the shoes to move radially as they are slid longitudinally, means encircling the shoes for moving the same along the runways, said means and each of the shoes having interlocking means, said interlocking means being effective only at a predetermined portion of the paths of the shoes, said interlocking means including a boss on each shoe and an inwardly extending recess on the encircling means, and each boss having a groove on its outer face and a resilient ring mounted in said groove for the purpose described.

2. In combination, a body member having a plurality of runways therein, shoes slidably mounted in said runways, a boss on each of said shoes, a groove in each boss, said grooves extending circumferentially, a resilient ring located in said grooves whereby the shoes are yieldably held against radial movement out of their runways and a collar having means thereon coacting with the several bosses to prevent axial movement therebetween but permitting radial and rotative movement and threads on the collar and the body member engaging each other whereby adjustment of the collar along the body member is had.

3. A tool comprising a cylindrical body member having external threads near one end and three equidistantly located runways extending axially therealong and tending toward convergence at the other end, three shoes, one shoe being slidably mounted in each runway, the shoes being of considerably lesser length than the body member and each shoe having a boss thereon, a collar threaded onto the external threads, and a split spring ring within the collar cooperatively associated with the several bosses, the ends of said ring extending laterally whereby the parting of the ring is held between the bosses at all times in order to cause substantially equal inward pressure thereon.

4. A lapping tool of the class described comprising, a body member having a plurality of runways extending from one end thereof, a shoe for each runway, the surfaces of the shoes and runways being so formed as to cause the shoes to move radially as they are slid longitudinally, lapping surfaces formed on one end of the shoes, resilient means encircling the shoes between the lapping surfaces and the other ends of the shoes whereby movement of the lapping surfaces outwardly is yieldingly resisted by a lever of the second class, and collar means associated with the shoes to adjust the same axially, said collar means extending over the resilient means to provide a concealing housing therefor.

5. A lapping tool of the class described comprising, a body member having a plurality of runways extending from one end thereof, said runways being grooved to a substantially constant depth, a shoe for each runway, a rib on each shoe, said rib being tapered in depth from nothing to substantially the depth of said grooves and fitting in one of said grooves and the surfaces of the shoes and runways being so formed as to cause the shoes to move radially as they are slid longitudinally, and means encircling the shoes for reciprocating the same.

ARTHUR J. BRICKNER.